US006674602B2

United States Patent
Miles

(10) Patent No.: US 6,674,602 B2
(45) Date of Patent: Jan. 6, 2004

(54) METHOD AND APPARATUS FOR WRITING CLOCK DATA TO A STORAGE MEDIUM

(75) Inventor: Michael A. Miles, Hayling Island (GB)

(73) Assignee: Xyratex Technology Limited, Havant (GB)

( * ) Notice: Subject to any disclaimer, the term of this patent is extended or adjusted under 35 U.S.C. 154(b) by 355 days.

(21) Appl. No.: 09/796,436

(22) Filed: Mar. 2, 2001

(65) Prior Publication Data

US 2001/0033451 A1 Oct. 25, 2001

Related U.S. Application Data

(60) Provisional application No. 60/187,013, filed on Mar. 6, 2000.

(51) Int. Cl.[7] .............................. G11B 21/02; G11B 5/09
(52) U.S. Cl. ............................................ 360/75; 360/51
(58) Field of Search .............................. 360/75, 48, 51, 360/39, 77.08, 26

(56) References Cited

U.S. PATENT DOCUMENTS 5,448,429 A    9/1995  Cribbs et al. .................. 360/75
5,485,322 A    1/1996  Chainer et al. ................ 360/51
5,668,679 A    9/1997  Swearingen et al. .......... 360/75
6,172,830 B1 * 1/2001  Leonard ....................... 360/51

FOREIGN PATENT DOCUMENTS

WO        WO 98/31015        7/1998

OTHER PUBLICATIONS

"Regenerative Clock Technique for Servo Track Writers", IBM Technical Disclosure Bulletin, US, IBM Corp., New York, vol. 33, No. 5, Oct. 1990.

* cited by examiner

Primary Examiner—Andrew L. Sniezek
(74) Attorney, Agent, or Firm—Pillsbury Winthrop LLP

(57) ABSTRACT

In a method of writing clock data to a storage medium whilst the storage medium is rotating, a burst of clock data is read from a present track. A burst of clock data for a subsequent track on the storage medium is generated in accordance with the burst of clock data read from the present track and its phase adjusted. The phase adjusted burst of clock data is written to the subsequent track. The steps are repeated for plural bursts of clock data around a revolution of the storage medium thereby to write clock data to the subsequent track.

9 Claims, 5 Drawing Sheets

METHOD AND APPARATUS FOR WRITING CLOCK DATA TO A STORAGE MEDIUM

This application claims the benefit of U.S. Provisional Application No. 60/187,013, filed Mar. 6, 2000.

The present invention relates to a method and an apparatus for writing clock data to a storage medium.

Information for systems such as data processing systems is typically stored on storage media. Particular use is made of storage disks such as magnetic disks, opto-magnetic disks, and the like. One type of magnetic disk arrangement is a so-called "head disk assembly" which is intended normally to be permanently fixed in a data processing system; the head disk assembly includes one or more magnetic disks and the associated read and write head or heads (the "product" head or heads) which write data to the disk and read data from the disk. Another type of magnetic disk arrangement is of a type known as "removable media" which normally consists of a magnetic disk medium in a protective plastics case which can be used to transfer data between data processing systems by physical transfer of the disk itself from one machine to another.

In a known method of manufacturing storage media such as hard disk drives, a head disk assembly consisting of the product head(s), the disk or disks, the motor and arm electronics, is mounted in a mastering station known as a servo-writer. The servo-writer writes a pattern of magnetic information (the "servo track pattern") onto the disk. The servo track pattern becomes the master reference which is used by the disk drive during normal operation in order to locate the tracks and sectors on the disk for data storage and retrieval. Clearly, the servo track pattern has to be accurately written to the disk at very well defined positions.

In order to be able to write the servo pattern onto the correct positions on the disk during manufacture of the disk, in one commonly used process, a (usually temporary) "clock" track is written onto the disk to serve as a timing reference during writing of the servo pattern. Conventionally, a separate clock head is used to write the clock track onto the disk and to read the clock track from the disk so that the servo tracks, which are written with the disk drive's product head, can be phase aligned with respect to the clock track and each other. However, the use of a dedicated clock track writing head is an expensive addition to the manufacturing process and further requires that the servo tracks be written in a clean room because the clock track writing head has to be inserted into the open (unsealed) head disk assembly. Moreover, in practice the clock heads have to be replaced on a daily basis because of damage which occurs during use.

U.S. Pat. No. 5,485,322 discloses a method and system for writing a clock track on a storage medium using an internal recording head of a hard disk drive. A timing pattern is generated on the storage medium with the internal recording head and a radial positioning value used in radially positioning the internal recording head is determined. The servo pattern is written at the locations determined by the generated timing pattern and radial positioning value. In effect, in this prior art system, the clock pattern is written in an iterative manner across the disk. However, there is a problem in that this method can introduce phase differences in a clock pattern between respective tracks on the disk. As a disk will often require many thousands of clock tracks across the disk, even very small phase errors in the clock track can cumulatively become very large.

U.S. Pat. No. 5,448,429 discloses another example of a system for writing clock tracks across a disk in which a written clock signal is read to provide a reference for the writing of the clock signal to a subsequent track.

U.S. Pat. No. 5,668,679 discloses another example of a method of writing servo tracks to a disk drive in which a clock track is written followed by spiral tracks across the disk. The clock track and the spiral tracks have missing pulses or bits and are used to locate the arm of the disk drive when the servo information is written.

In any of these prior art proposals for a "self-servowriting" disk, as well as others not specifically mentioned herein, owing to slight deviations in the rotational speed of the hard disk, non-circularity of the disk or track, off-centre mounting of the disk, and other factors arising from operation of the electronic circuitry, the phase of the track about to be written must in practice be adjusted to ensure that the track is phase aligned with the previously written track, to ensure that precisely the correct number of clock pulses fit in one complete revolution of the disk and to ensure that these pulses are spaced as uniformly as possible and to ensure that the servo information is written in the correct place. A phase locked loop circuit, which conventionally is an analogue phase locked loop circuit, is used to lock to the clock track that has been written previously in order to ensure that the next track is phase aligned with the previously written track.

In our WO-A-98/31015, the entire disclosure of which is incorporated herein by reference, there is disclosed a "self-clocking" method and apparatus for writing clock data to a storage medium, such as a disk. The storage medium has tracks on which data can be stored. Clock data is written to a present track on the storage medium. The written clock data is read from that track. Clock data for a subsequent track on the storage medium is generated from the clock data read from said present track. The phase of the generated clock data for the subsequent track is compared with a reference timing signal and the phase of the generated clock data for the subsequent track is adjusted in accordance with said comparison. The comparison with a reference timing signal, which may be obtained for example from the back emf of the disk drive motor, may be carried out once per revolution of the disk. The phase adjusted clock data for the subsequent track is then written to said subsequent track. In this method and apparatus, it is again not necessary to provide a dedicated clock read/write head. As in other proposals of this type, the servo information is written to the disk using the clock track data to position the servo information very accurately. To save time, it is preferred that the servo information in a track be written alternately with the clock data in that track, i.e. for any track, a portion of clock data is written, that clock data being phase aligned with the clock data in the previous track, and then a burst of servo data is written, again appropriately phase aligned with the previous track, followed by the next portion of clock data, and so on.

The method and apparatus disclosed in WO-A-98/31015 are very useful for correcting the low frequency phase error which can occur in a self-clocking process from say the inside diameter (ID) to the outside diameter (OD) of the disk during the writing process so that the total of the phase error across the disk is reduced practically to zero. However, because the phase of the generated clock data for the subsequent track is compared with a reference timing signal to determine the phase correction required, the method and apparatus disclosed in WO-A-98/31015 are not able to correct the high frequency phase errors which can occur between clock tracks within a revolution of the disk.

According to a first aspect of the present invention, there is provided a method of writing clock data to a storage medium whilst the storage medium is rotating, the method comprising the steps of:

(A) reading a burst of clock data from a present track;
(B) generating a burst of clock data for a subsequent track on the storage medium in accordance with the burst of clock data read from said present track;
(C) adjusting the phase of the generated burst of clock data;
(D) writing said phase adjusted burst of clock data to said subsequent track; and,
(E) repeating steps (A) to (D) for plural bursts of clock data around a revolution of the storage medium thereby to write clock data to said subsequent track.

The present invention allows the bursts of clock data to be properly aligned in phase with each other, with a minimal or practically zero track-to-track phase error. This can be achieved without affecting the operation of the phase locked loop typically used in the apparatus and can be used in conjunction with phase adjustment already acting to minimise phase errors around a track on the disk or across the disk, for example from the ID to the OD. The method and apparatus therefore allows for highly accurate writing of clock data to a storage medium using for example the internal read/write elements associated with the storage medium, thereby facilitating the writing of clock and servo data to a storage medium outside of a clean room.

Preferably, the method comprises the step of measuring the phase error introduced on reading a burst of clock data from the present track, and step (C) includes the step of adjusting the phase of the generated burst of clock data on the basis of the phase error introduced on reading the burst of clock data from the present track. Thus, the phase correction introduced by the present method is calculated in this example using a history of burst to burst errors, allowing for accurate phase adjustment.

Most preferably, the method comprises the step of measuring the phase error introduced on reading plural bursts of clock data from the present track, and step (C) includes the step of adjusting the phase of the generated burst of clock data on the basis of the phase error introduced on reading said plural bursts of clock data from the present track. Thus, an averaged history of burst to burst errors can be used in calculating the required phase adjustment, providing for more accurate phase adjustment.

Steps (A) to (E) are preferably repeated across the tracks on the storage medium, with the burst of clock data read from a certain track in a step (A) being the burst of clock data written in a step (D) for that track.

Steps (A) to (E) are preferably repeated for every track on the storage medium.

In an embodiment, the method comprises the step of, prior to step (A), writing plural consecutive bursts of clock data around a revolution of the storage medium to provide a substantially contiguous clock track around a revolution of the storage medium. This provides an initial reference and source of an initial clock track for the subsequent copying of clock data across the storage medium.

According to a second aspect of the present invention, there is provided apparatus for writing clock data to a storage medium whilst the storage medium is rotating, the apparatus comprising:

a data reader for reading a burst of clock data from a present track;
a pattern generator for generating a burst of clock data for a subsequent track on the storage medium in accordance with the burst of clock data read from said present track;
a phase error adjuster for adjusting the phase of the generated burst of clock data; and,
a data writer for writing said phase adjusted burst of clock data to said subsequent track;

the apparatus being adapted to read a burst of clock data from a present track, generate a burst of clock data for a subsequent track on the storage medium in accordance with the burst of clock data read from said present track, adjust the phase of the generated burst of clock data and write the phase adjusted burst of clock data to said subsequent track for plural bursts of clock data around a revolution of the storage medium thereby to write clock data to said subsequent track.

The phase error adjuster is preferably arranged to adjust the phase of the generated burst of clock data on the basis of the phase error introduced on reading the burst of clock data from the present track.

The phase error adjuster is most preferably arranged to adjust the phase of the generated burst of clock data on the basis of the phase error introduced on reading plural bursts of clock data from the present track.

An embodiment of the present invention will now be described by way of example with reference to the accompanying drawings, in which.

Figure 1:
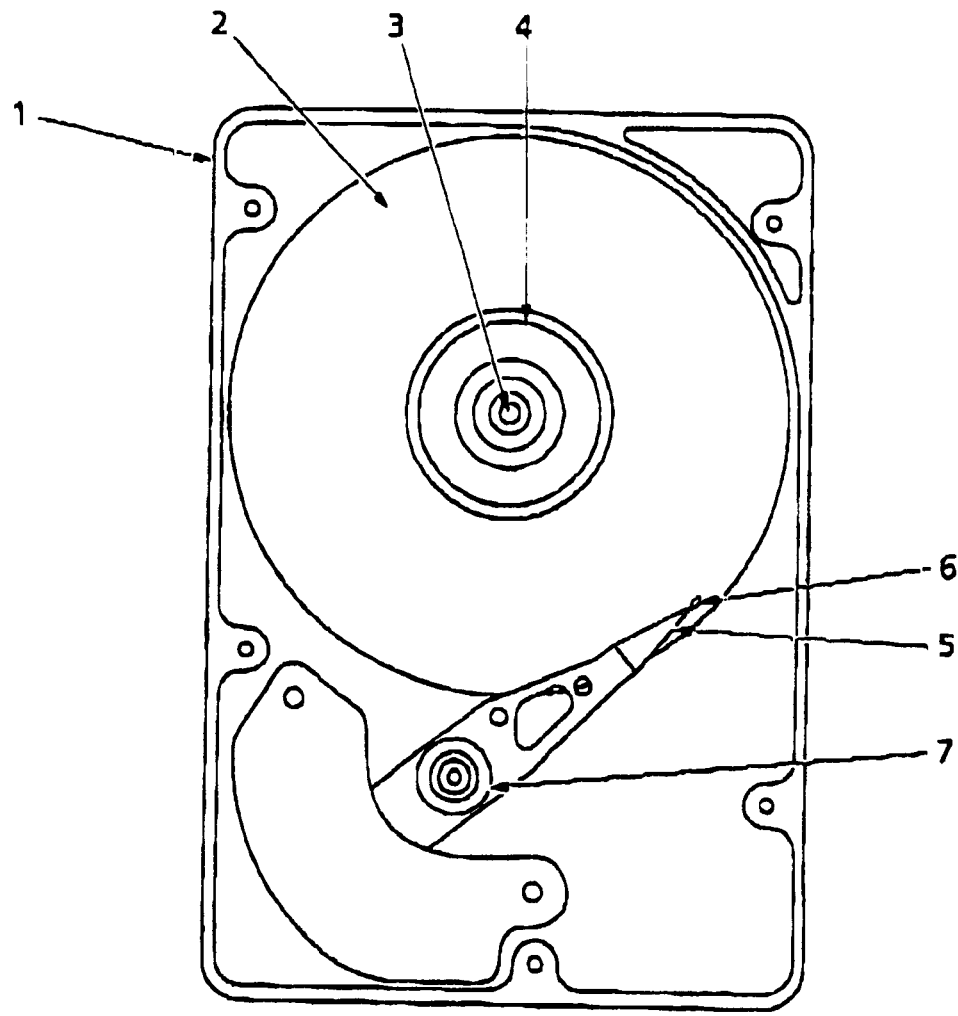
FIG. 1 is a schematic plan view of a head disk assembly.

Referring to FIG. 1, a head disk assembly 1 has a rotating magnetic disk 2 which is mounted on a spindle 3 of a disk drive motor 4 which rotates the disk 2. The head disk assembly 1 includes a so-called product arm 5 which carries a read/write head 6 which includes read and write elements for reading data from the disk 2 and writing data to the disk 2 in normal use of the head disk assembly 1. Such data will normally be user data. The arm 5 can be pivotally moved over the surface of the disk 2 by an actuator 7.

In the preferred embodiment of the present invention, the product arm 5 with the read/write head 6 is used during the servo track writing process to write clock and servo tracks to the disk 2 during manufacture and set-up of the disk 2, thus obviating the need for a dedicated clock head in a dedicated servo track writer as has been common in the past. As there is no need for a separate clock head which must enter the head disk assembly during the servo track writing process, the head disk assembly 1 can be completely sealed after manufacture and prior to the servo track writing process. It is therefore not necessary for the servo track writing process to be carried out in a clean room.

Figure 2:
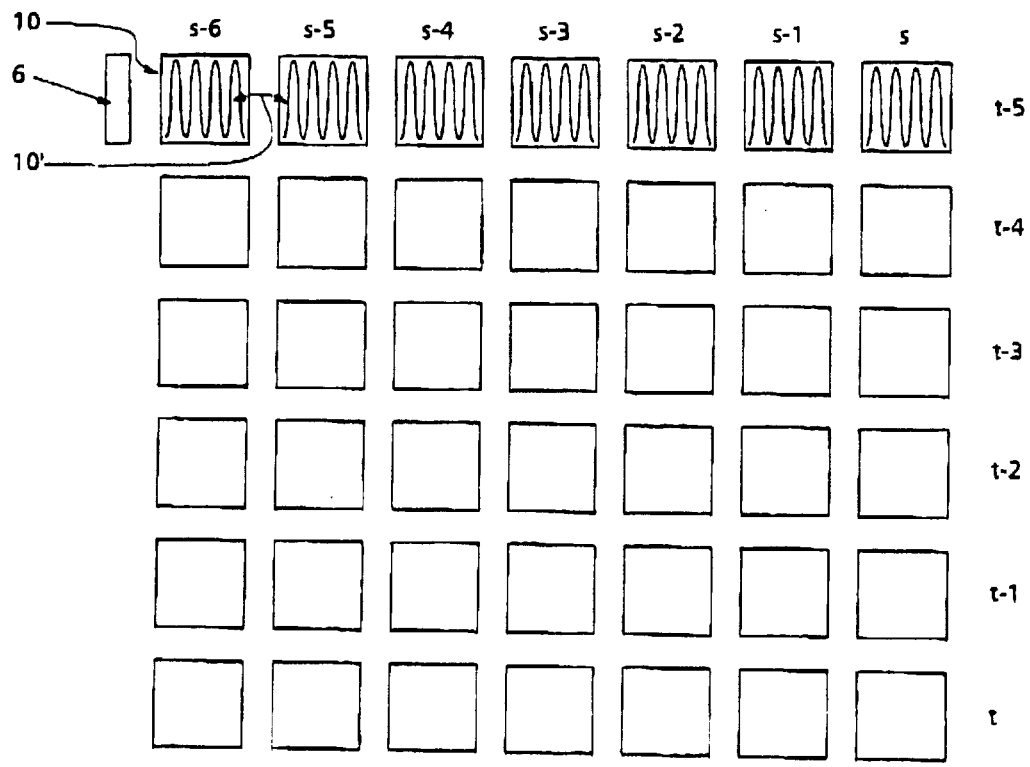
FIGS. 2 to 5 are schematic representations of sectors on a storage medium showing the writing of clock tracks to the storage medium.

FIG. 2 shows schematically tracks t on the disk 2 which are divided in known manner into sectors s. In a first stage of an example of the servo track writing process, a contiguous clock track 10 is written to one of the tracks (the track t-5 in the example shown in FIG. 2) on the disk 2 using the read/write head 6 of the product arm 5, the position of the read/write head 6 relative to the track being shown in FIG. 2. When "closure" of the clock track 10 has been achieved, i.e. when the clock track 10 contains the correct number of bursts 10' of clock data and the join between the first and last written bursts 10' of clock data is within predetermined limits, operation switches to a clock copy mode.

At this stage, the calibration of read/write separation is started. First, even bursts are written and phase adjusted for minimum closure error, followed by odd bursts. This gives a measure of the gap between the read and write elements computed from linear velocity and radius. A feed forward table then computes offset for all radii.

Figure 3:
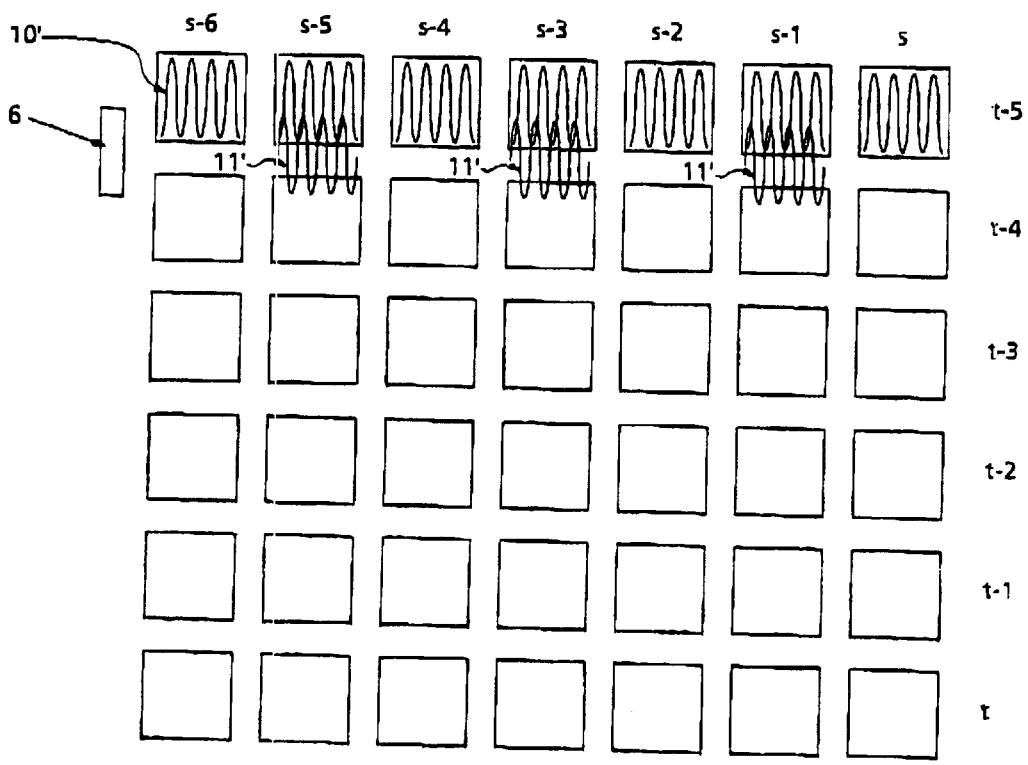

As shown in FIG. 3, the read/write head 6 is then moved half a track width towards the next track t-4 so that the read/write head 6 lies halfway over the first track t-5 which includes the contiguous clock track 10 and halfway over the next track t-4. In some embodiments, it may be preferred to step the read/write head 6 downwards by one third of a track width, though the principles are the same.

In an interleaved manner, the read/write head 6 then alternately reads bursts 10' of clock data from the contiguous clock track 10 and writes bursts 11' of clock data in order to begin writing the clock track 12 for the next track t-4. In particular, the read/write head 6 first passes over half of sector t-5,s-6 and reads clock data 10' in that sector. The data read from the sector t-5,s-6 is used to generate the write clock data 11' which is written partly to sector t-5,s-5 and partly to sector t-4,s-5. The read/write head 6 then moves relative to the disk 2 parallel to the tracks to lie halfway over the sectors t-5,s-4 and t-4,s-4 and reads clock data 10' in the sector t-5,s-4. That read data is then used to generate the write clock data which is written partly to sector t-5,s-3 and partly to sector t-4,s-3. This process is repeated around a whole revolution of the disk 2.

Figure 4:
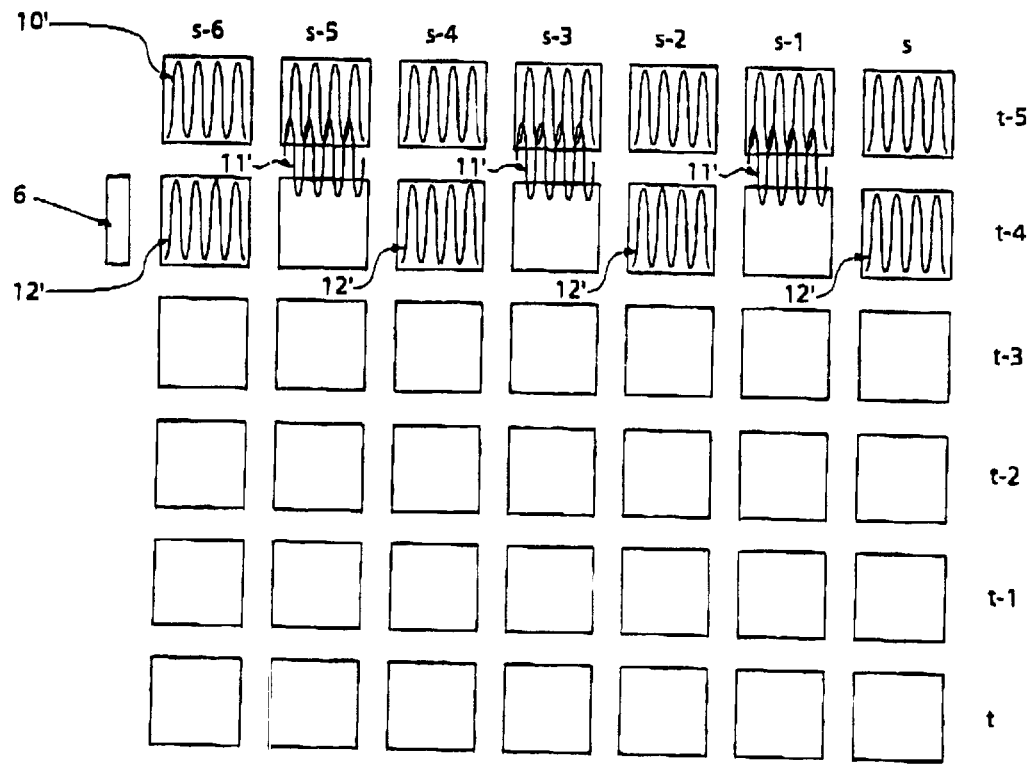

Referring to FIG. 4, in the next step, the read/write head 6 is moved down a further half track to lie entirely over the next track t-4. When located over for example the sector t-4,s-5, the read/write head 6 reads the clock data 11' which partly fills this sector and the write data 12' for the next sector t-4, s-4 is generated from the data just read. That generated data 12' is then written to the next sector t-4,s-4. The read/write head 6 then reads the clock data 11' partly filling the next sector t-4,s-3 and generates the next write data 12' which is then written to the next sector t-4,s-2. Again, this process is repeated around a whole revolution of the disk 2.

Figure 5:
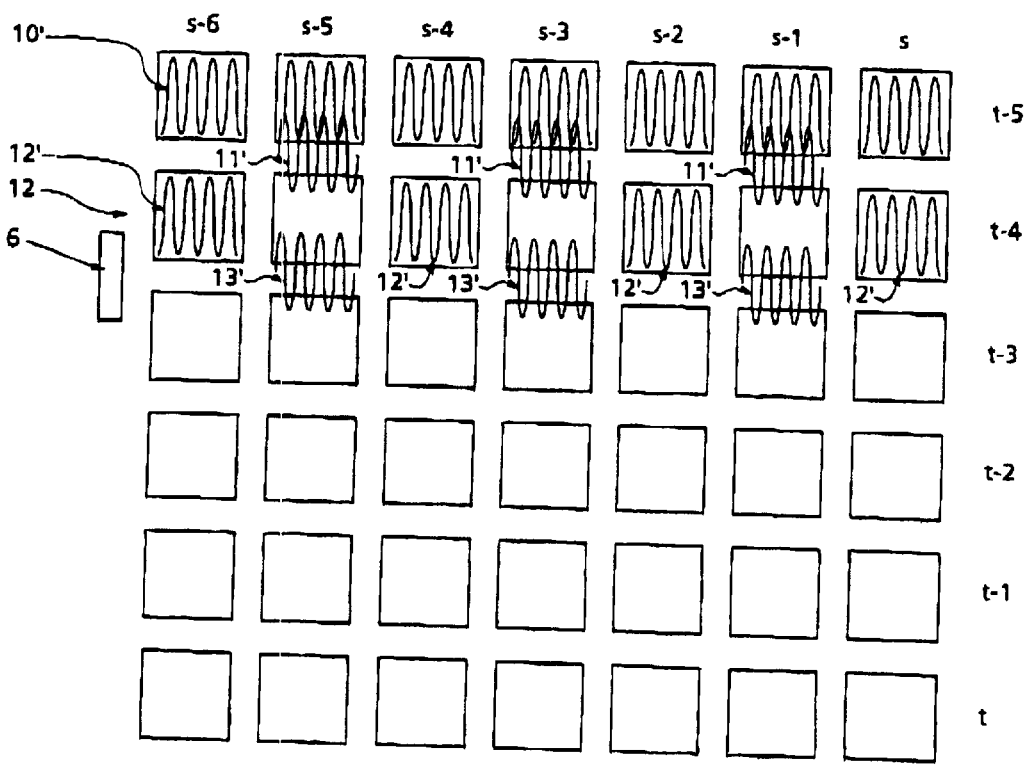

Referring now to FIG. 5, the read/write head 6 is advanced a further half track to lie halfway over the two tracks t-4 and t-3. Clock data 12' in for example sector t-4,s-6 is read to generate the next clock data 13' which is written partly to sector t-4,s-5 and partly to sector t-3,s-5. Clock data is then read from the next sector t-4,s-4 to generate the next clock data 13' which is written partly to the sectors t-4,s-3 and t-3,s-3. This is repeated for the remaining sectors in the tracks t-4 and t-3. In this way, a complete clock track 12 is written to the track t-4 around a revolution of the disk 2. The process is then repeated for subsequent tracks on the disk 2 so that every track on the disk 2 has its own clock track.

Though not specifically shown in the drawings, it will be understood that servo data is written to appropriate sectors in each track, the clock tracks being used to position the servo data accurately in the appropriate positions on the disk 2 during the servo writing process. As is well known, the servo data is used in the finally completed disk 2 in normal use to locate the read/write head 6 at appropriate positions over the disk 2 to read user data from and to write user data to the disk 2.

As will be apparent, it is important that the bursts of clock data 10', 11',12' . . . be properly aligned in phase with each other because phase misalignment of the various bursts of clock data will cause problems in detection of the sectors during normal use of the head disk assembly 1. This is particularly the case where the frequency of the servo data increases, the pitch of the tracks increases, and the rotational speed of the disk 2 increases as these products develop over time to be able to store increasingly large amounts of data. Even though a phase locked loop can be used to control the phase of the various data signals, variations in phase can arise owing to various effects including for example propagation delays in the write circuit, the magnetic effects of writing the clock data to the disk and reading the clock data from the disk within the magnetic head 6, and the read channel and decode circuitry. Moreover, if the phase locked loop used is implemented with digital components or circuitry rather than analogue components or circuitry, a quantisation error can arise. In addition, there is also a noise or error term associated with recovery of the read/write head 6 and associated circuitry between consecutive read and write steps. Accordingly, phase errors can arise and, moreover, the phase errors can be variable and may vary with position of the head 6 across the disk 2 and/or with time.

The method and apparatus disclosed in our WO-A-98/31015 mentioned above is able to reduce practically to zero the total phase error around the whole of a track on a once per disk-revolution basis. This corresponds to a relatively low frequency phase control. However, the method and apparatus of WO-A-98/31015 is not able to correct errors in phase which can occur within a revolution of the disk 2 and which can give rise to a track-to-track phase error between radially aligned magnetic transitions written during two independent write cycles and revolutions of the disk 2. This is shown schematically in FIG. 6.

Figure 6:
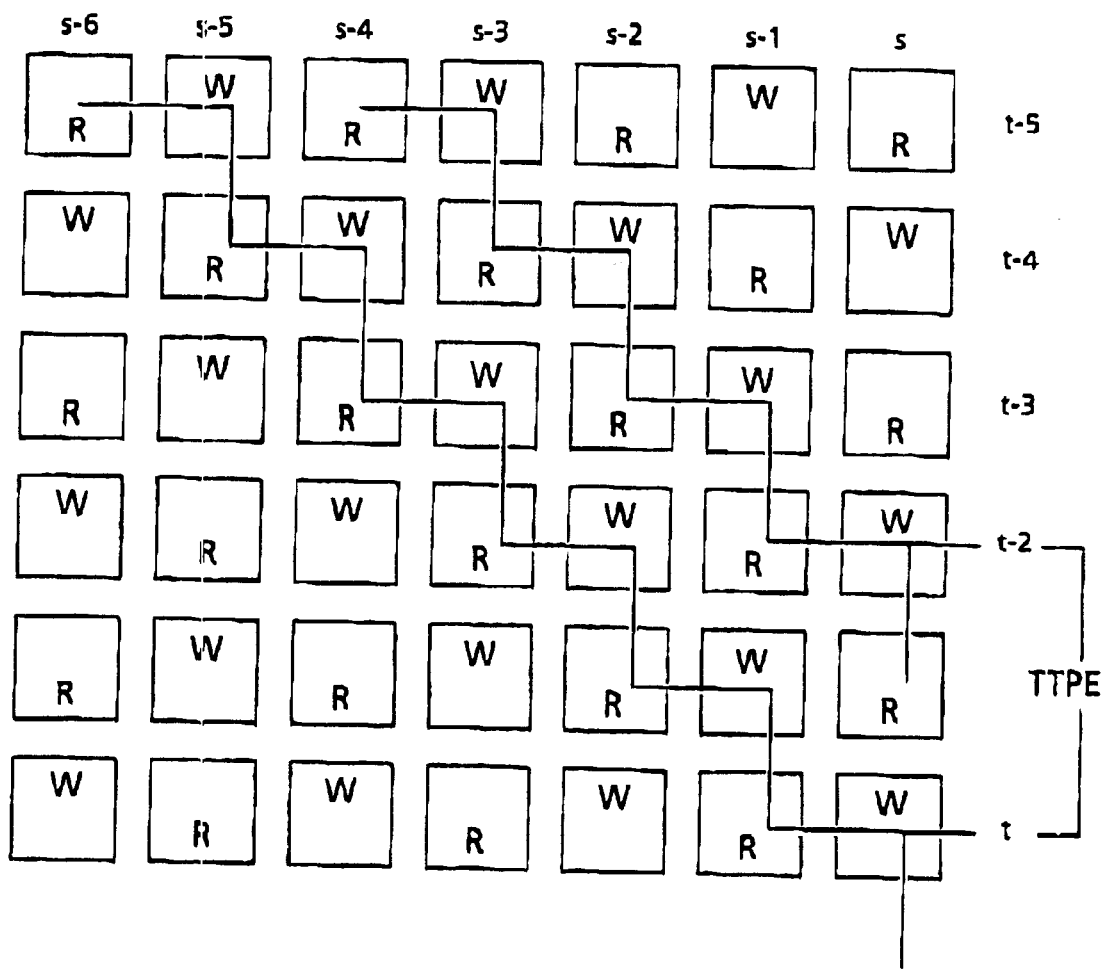
FIG. 6 is a schematic representation of sectors on the storage medium showing the build-up of phase errors; and, FIG. 7 is a block circuit diagram of an example of apparatus according to and for carrying out the present invention.

Referring now to FIG. 6, bearing in mind the way the bursts of clock data are written to the sectors as described above with reference to FIGS. 2 to 5, a random phase error occurring during the read on for example sector t-5, s-6 is written to the clock data at sector t-4,s-5. This is repeated such that, in general, a random error occurring during the read on sector t, s is written into the clock data at sector t+1, s+1. As indicated in the drawings, these errors propagate randomly on independent spiral trajectories across the surface of the disk 2 and, in general, the errors are bounded only by the ability of the phase locked loop to obtain a phase lock when data is being read. Accordingly, even though the total phase error in any particular clock track around a whole revolution of the disk 2 may be maintained practically at zero, a track-to-track phase error ("TTPE") can arise between the radially aligned magnetic transitions written during two independent write cycles and revolutions of the disk 2, the track-to-track phase errors having large variations across the disk 2. It will be noted from FIG. 6 that, in general, the track-to-track phase error pair are the sectors t, s and t-2, s. It is necessary to minimise the build up of these independent and random track-to-track phase errors across the disk 2 during the servo track writing process and to do so without affecting the operation of the phase locked loop and without affecting any phase error adjustment already acting to minimise phase errors around a track on the disk 2.

Figure 7:
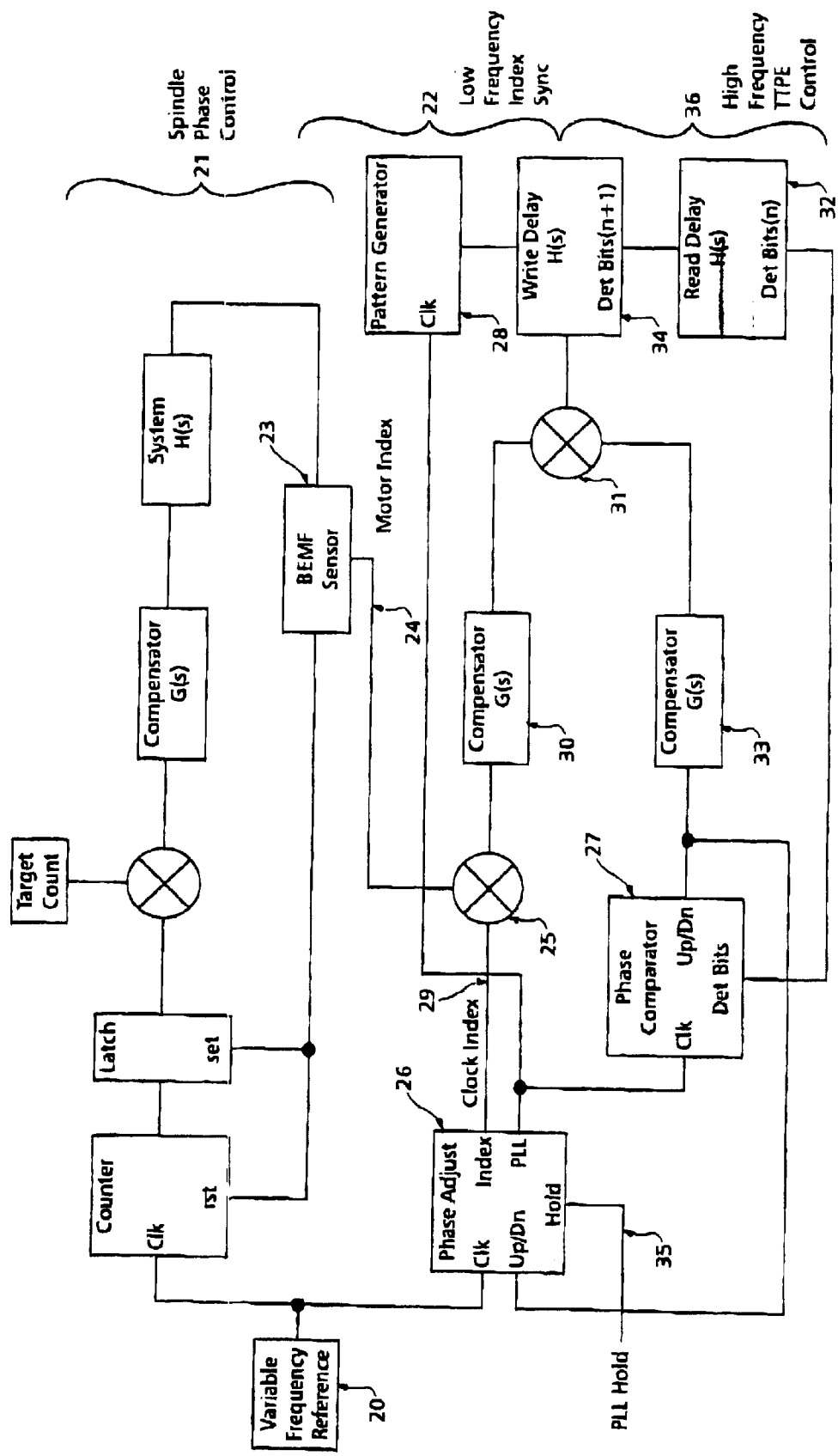

FIG. 7 shows schematically a circuit diagram of apparatus according to and for carrying out the present invention. A frequency source 20 provides a variable reference frequency. This is used in a spindle phase control section 21 as the source for the drive signal for the motor 4 which drives the spindle 3 in order to rotate the disk 2. The same frequency source 20 is used to generate the bursts of clock data to be written to the disk 2.

In accordance with the method and apparatus disclosed in our WO-A-98/31015, a low frequency index synchronisation portion 22 of the circuit is used to control the phase of the clock track around a revolution of the disk on a once per revolution basis. In the example shown in FIG. 7, which corresponds to one of the examples described in WO-A-98/31015, a back emf sensor 23 produces a motor index signal 24 from the back emf generated by the disk drive motor 4, the motor index signal 24 being passed to a summing junction 25. The reference frequency from the frequency source 20 is passed to a digital phase adjuster 26 which together with a digital phase comparator 27 forms a digital phase locked loop. An output of the phase adjuster 26 is passed to a pattern generator 28 which generates the basic data to be written to the disk 2. A clock index signal 29 is passed from the phase adjuster 26 to the first summing junction 25 where it is added to the motor index signal 24. The output of the first summing junction 25 is passed to a digital filter or compensator 30 in which an appropriate phase correction algorithm is embodied in accordance with for example the teachings of WO-A-98/31015 to produce a write phase adjustment thereby to provide the low frequency index synchronisation disclosed in WO-A-98/31015. The write phase adjustment which is output from the first compensator 30 is passed to a second summing junction 31.

When clock data from a particular sector n on the disk 2 is read with a read circuit 32, the so-called detected bits thereby obtained are passed to the phase comparator 27 where their phase is compared with the phase of the clock signal obtained from the phase adjuster 26. An up/down counter in the phase comparator 27 measures the phase difference or error between the detected bits and the generated clock signal and provides an output which is passed to the phase adjuster 26 as part of the phase locked loop and also to a second digital filter or compensator 33. As will be discussed further below, a write phase adjustment for the sector n+1 about to be written is generated in the second compensator 33. The write phase adjustment is passed to the second summing junction 31 where it is added to the phase adjustment obtained from the first compensator 30 to provide a composite phase adjustment for the write signal. The composite phase adjustment is added by a write delay circuit 34 to the generated pattern signal obtained from the pattern generator 28. The finally phase adjusted pattern is then written to the disk 2.

In an embodiment, the write phase adjustment generated in the second compensator 33 for the sector n+1 about to be written is generated on the basis of the phase error which is introduced on reading the burst of clock data from at least the present sector n. In the preferred embodiment, the write phase adjustment generated in the second compensator 33 is generated on the basis of the phase errors introduced on reading the bursts of clock data from several or many previously written sectors. In an embodiment, a general write phase adjustment y(n+1) generated in the second compensator 33 may be calculated as follows:

$$y(n+1)=a(1)\cdot x(n)+a(2)\cdot x(n-1)+ \ldots +a(n)\cdot x(1)$$

where y(n+1) is the write phase adjustment for the sector n+1 obtained in the second compensator and x(n) is the read phase error from the sector n. The constants a(1) to a(n) are weighted constants and are linked to the error arising from variations in the spindle rotational speed. Typically, the constants a(1) to a(n) are determined empirically in advance to provide optimum phase adjustment. Preferably, a(1)+a(2)+ . . . +a(n)=1. This ensures that the average error around a revolution of the disk remains constant, i.e. as the phase is adjusted on the basis of plural sectors, this ensures that the sum of the phase adjustment does not affect the total count for the revolution and no information is lost. In a simplistic example for a three sector sequence, a(1) might be 60% and a(2) and a(3) 20% each or in another example a(1) might be 80%, a(2) 15% and a(3) 5%.

Accordingly, after the initial contiguous clock track 10 has been written and closed at the correct count and the error at the join is within predetermined limits, control switches to clock copy mode. During most or all of the time that a sector is being read, the phase locked loop formed by the phase adjuster 26 and phase comparator 27 is active and the error counter in the phase comparator 27 is initialised to measure the phase error between the read data (the detected bits) and the clock signal from the phase adjuster 26 in order to adjust the phase locked loop accordingly. A write phase adjustment for the first write is generated by the second compensator 33 on the basis of the read phase error as measured in the phase comparator 27 and, in combination with any write phase adjustment from the first compensator 30, is used to provide a composite write phase adjustment used in the write delay circuit 34. It will be understood that the phase locked loop is "held" under control of a "hold" signal 35 input to the phase adjuster 26 during all steps in the process other than during a clock read.

After the first sector write has been completed, the phase locked loop window is adjusted so that the newly written burst of clock data is read as well as the previously written burst of clock data. The phase error then measured by the phase comparator 27 provides an averaged error across the sectors and becomes a direct measurement of the read-to-write error. This process is repeated whilst adjusting the values of the constants a(n) in the formula mentioned above in order to obtain a zero reading. Having obtained the values for the constants a(n), the clock track copying process can proceed as described above and shown schematically in FIGS. 2 to 5, with appropriate write phase adjustments being generated in the second compensator 33 to provide a high frequency track-to-track phase error control 36. Preferably, the read phase errors from a relatively large number of previously written sectors is used in the algorithm employed to generate the high frequency write phase adjustment in the second compensator 33. For example, some 600 to 1000 samples per revolution can be made.

An embodiment of the present invention has been described with particular reference to the examples illustrated. However, it will be appreciated that variations and modifications may be made to the examples described within the scope of the present invention. For example, the algorithm used in the second compensator 33 described above may be of different form.

Reference is made to copending patent application numbers (1) entitled "A CLOCKING METHOD AND APPARATUS FOR A STORAGE MEDIUM" and (2) entitled "METHOD AND APPARATUS FOR WRITING CLOCK DATA TO A STORAGE MEDIUM" of even date, which are owned by the owner of the present application, and the entire contents of which are incorporated herein by reference.

What is claimed is:

1. A method of writing clock data to a storage medium whilst the storage medium is rotating, the method comprising:

(A) reading a burst of clock data from a present track;

(B) generating a burst of clock data for a subsequent track on the storage medium in accordance with the burst of clock data read from said present track;

(C) measuring the phase error introduced on reading said burst of clock data from the present track and adjusting the phase of the generated burst of clock data on the basis of the phase error introduced on reading the burst of clock data from the present track;

(D) writing said phase adjusted burst of clock data to said subsequent track; and, (E) repeating steps (A) to (D) for plural bursts of clock data around a revolution of the storage medium thereby to write clock data to said subsequent track.

2. A method according to claim 1, comprising measuring the phase error introduced on reading plural bursts of clock data from the present track, and wherein step (C) includes adjusting the phase of the generated burst of clock data on the basis of the phase error introduced on reading said plural bursts of clock data from the present track.

3. A method according to claim 2, wherein steps (A) to (E) are repeated across the tracks on the storage medium, with the burst of clock data read from a certain track in a step (A) being the burst of clock data written in a step (D) for that track.

4. A method according to claim 3, wherein steps (A) to (E) are repeated for every track on the storage medium.

5. A method according to claim 1, wherein steps (A) to (E) are repeated across the tracks on the storage medium, with the burst of clock data read from a certain track in a step (A) being the burst of clock data written in a step (D) for that track.

6. A method according to claim 5, wherein steps (A) to (E) are repeated for every track on the storage medium.

7. A method according to claim 1, comprising, prior to step (A), writing plural consecutive bursts of clock data around a revolution of the storage medium to provide a substantially contiguous clock track around a revolution of the storage medium.

8. Apparatus for writing clock data to a storage medium whilst the storage medium is rotating, the apparatus comprising:

a data reader for reading a burst of clock data from a present track;

a pattern generator for generating a burst of clock data for a subsequent track on the storage medium in accordance with the burst of clock data read from said present track;

a phase error adjuster for adjusting the phase of the generated burst of clock data on the basis of the phase error introduced on reading the burst of clock data from the present track; and, a data writer for writing said phase adjusted burst of clock data to said subsequent track;

the apparatus being adapted to read a burst of clock data from a present track, generate a burst of clock data for a subsequent track on the storage medium in accordance with the burst of clock data read from said present track, adjust the phase of the generated burst of clock data on the basis of the phase error introduced on reading the burst of clock data from the present track, and write the phase adjusted burst of clock data to said subsequent track for plural bursts of clock data around a revolution of the storage medium thereby to write clock data to said subsequent track.

9. Apparatus according to claim 8, wherein the phase error adjuster is arranged to adjust the phase of the generated burst of clock data on the basis of the phase error introduced on reading plural bursts of clock data from the present track.

* * * * *